United States Patent Office 3,164,530
Patented Jan. 5, 1965

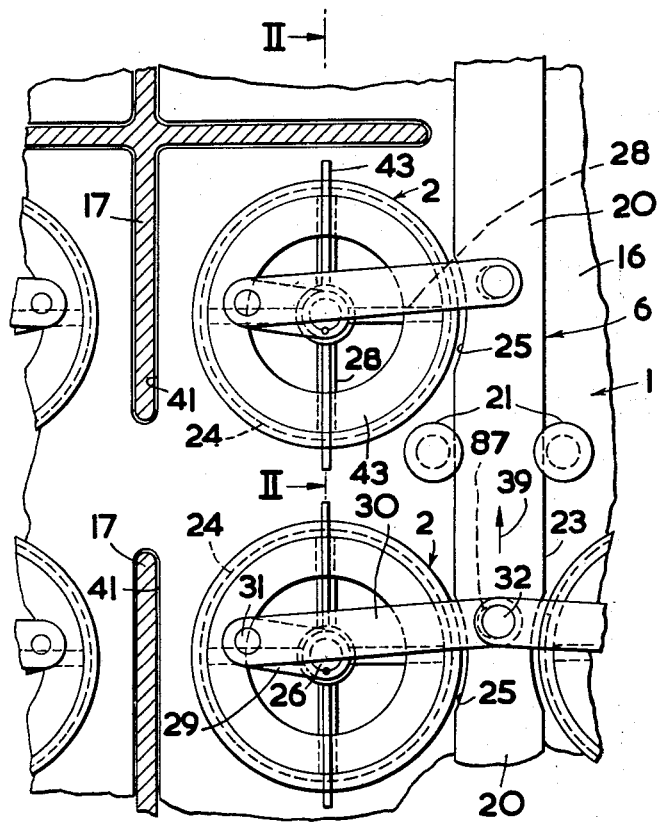
FIG.I.

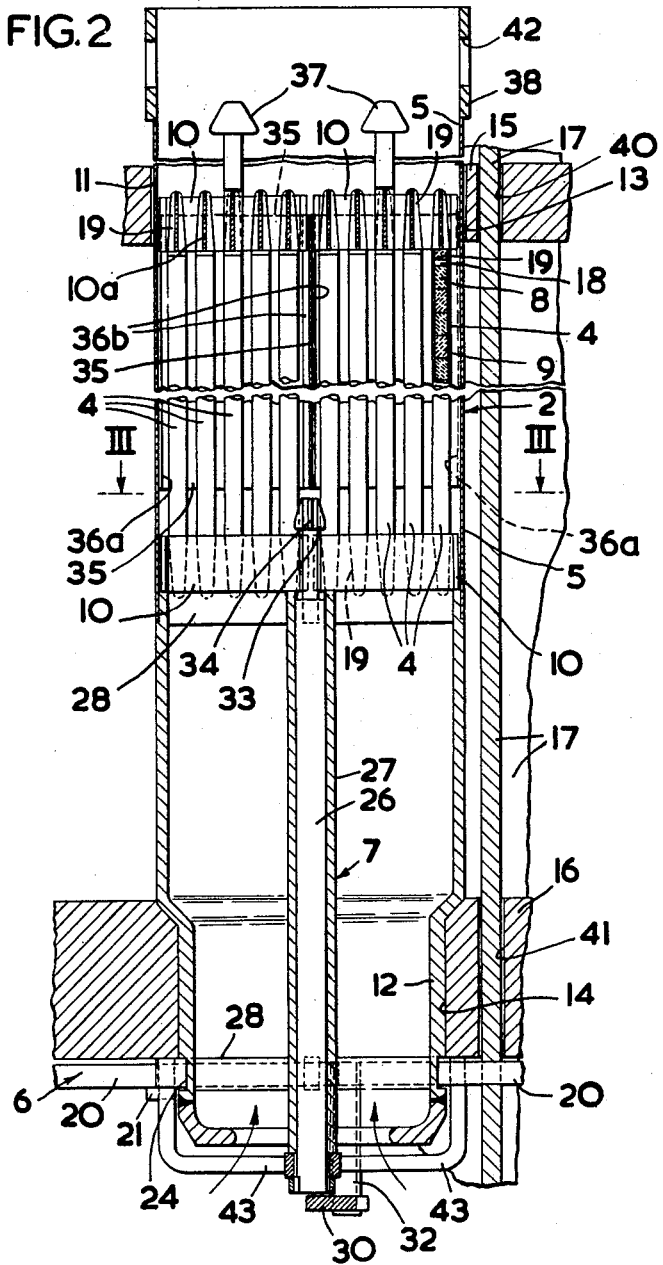

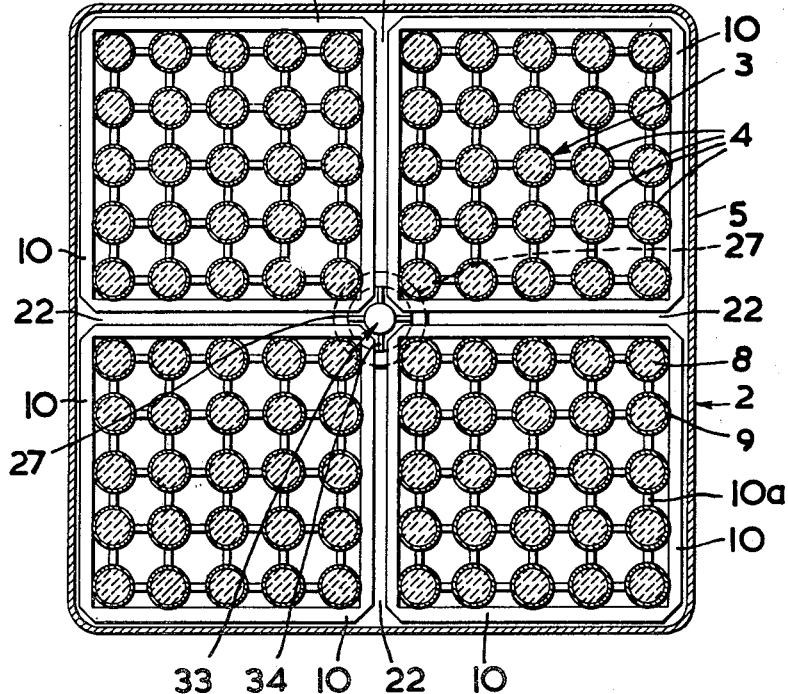

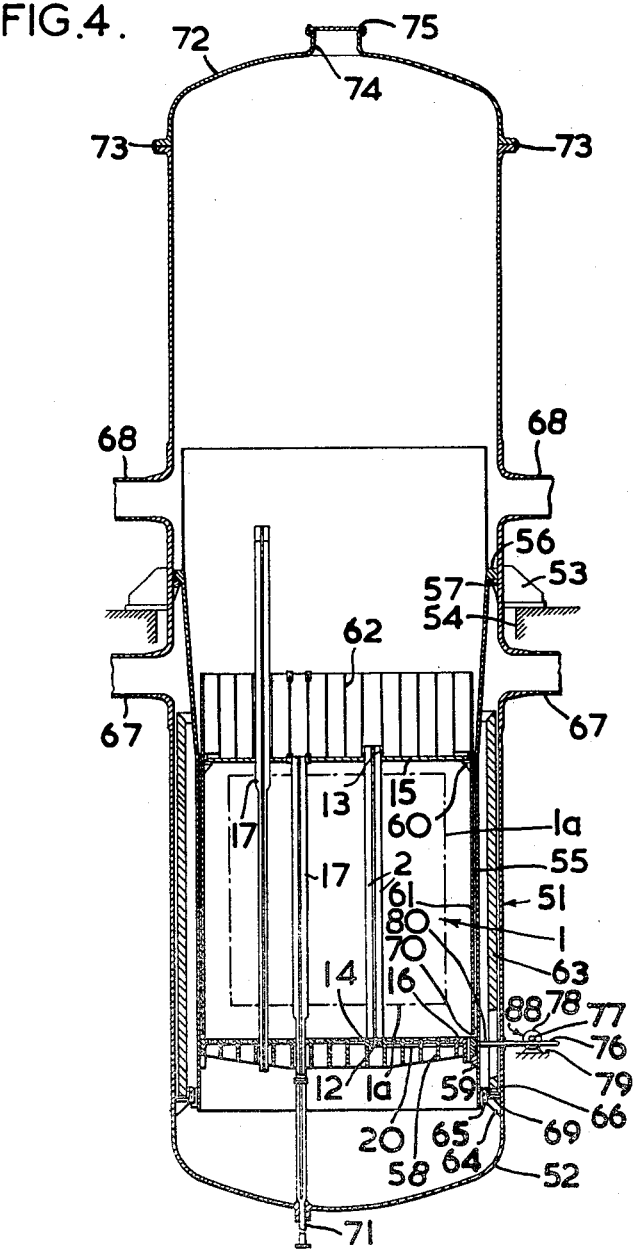

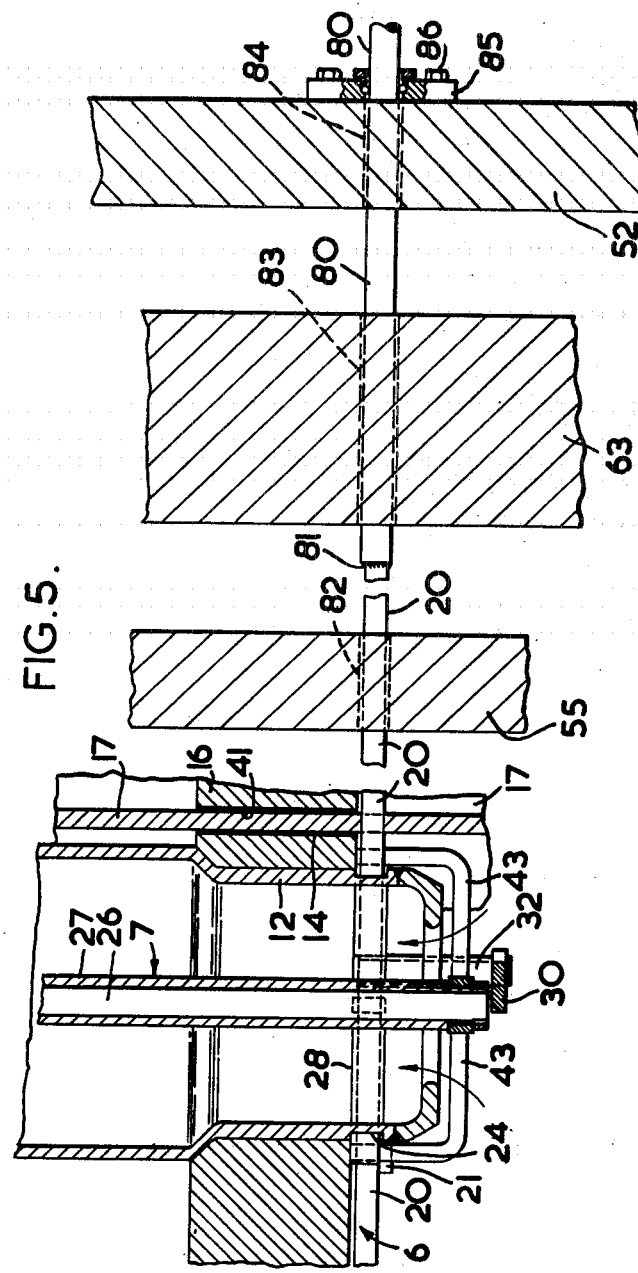

3,164,530
NUCLEAR REACTOR CORE WITH FUEL
LOCKING MEMBERS
Othniel Neil Banks, Culcheth, Warrington, England, assignor to United Kingdom Atomic Energy Authority, London, England
Filed Sept. 5, 1961, Ser. No. 135,844
Claims priority, application Great Britain Sept. 5, 1960
3 Claims. (Cl. 176—87)

This invention relates to nuclear reactor core structures.

According to the invention, a nuclear reactor core structure of the kind having fuel assemblies each of which comprises a spaced cluster of nuclear fuel elements housed in a tubular coolant-conducting container is characterised in the provision of first latching means for releasably retaining the fuel elements in the containers and of second latching means for releasably retaining the containers in the reactor core structure.

By making the fuel elements releasable from the containers, the containers can be re-used when irradiated fuel elements are required to be removed from the reactor for processing. Releasing of the fuel elements from the containers also allows radial "shuffling" of the fuel elements within the containers so as to even out burn-up of nuclear fuel in the reactor core.

By making the containers retainable in the reactor core, the arrangement is suitable for a reactor cooled by an upward flow of coolant through the reactor core, for the fuel elements housed in the containers can then resist disturbing movements due to a coolant pressure drop across the core. The arrangement is also suitable for a ship-borne reactor as, in the event of the ship capsizing, the containers cannot fall out of the reactor core to form a fissile mass of uncertain behaviour.

An embodiment of the invention will now be described by way of example with reference to the accompanying drawings wherein:

FIGURE 1 is a fragmental inverted plan view of FIGURE 4.

FIGURE 2 is a section taken on the lines II—II FIGURE 1, and

FIGURE 3 is a section taken on the lines III—III of FIGURE 2,

FIGURE 4 is a side view in medial section of a nuclear reactor,

FIGURE 5 is an enlarged detail of FIGURE 4.

Referring to FIGURES 1 to 3, a nuclear reactor core structure 1 is formed by a close-packed lattice of fuel assemblies 2 each of which comprises a spaced cluster 3 of nuclear fuel elements 4 housed in a tubular, coolant-conducting container 5. Latching members 7 are provided for releasably retaining the fuel elements 4 in the containers 5 and latching members 6 are provided for releasably retaining the containers 5 in the reactor core structure 1.

The fuel elements 4 in each cluster 3 are divided into four groups of twenty-five by longitudinally extending division plates 35 having flanged sides 36a attached by resistance welding to the inner walls of the container 5 and flanged side 36b similarly attached to adjacent division plates. The division plates 36 are apertured in a manner not shown in the drawing to save weight, reduce neutron absorption and allow intermixing of coolant between the fuel rod groups. Each fuel element 4 is formed by a stack of $UO_2$ fuel pellets 8 enclosed in a stainless steel sheath 9 closed by end caps 19. A gap 18 between the upper end cap 19 and the upper fuel pellet 8 provides a space for the fuel pellets 8 to expand into and a space for fission product gases to collect so as not to exert undue pressure on the sheath 9.

The upper and lower ends of the fuel elements 4 of each group are located in grid supports 10 formed by intersecting webs 10a. The end caps 19 of the fuel elements 4 are slotted to receive the webs 10a and are secured thereto by brazing. The upper grid supports 10 are located with slight clearance in the spaces defined by the division plates 35 with the inner walls of the container 5 thus ensuring that the lower grid supports 10 are spaced from one another below the division plates 35 by gaps 22 (FIG. 3).

Lifting heads 37 are attached to the central fuel element 4 of each group of fuel elements.

The containers 5 have upper and lower end terminations 11, 12 for location in apertures 13, 14 penetrating upper and lower support plates 15, 16. Core coolant enters each container 5 by way of the lower end termination 12, and, after passing over the fuel elements 4 in an upward direction, leaves the container by way of the upper termination 11. The reactor is controlled by neutron absorbing control members 17 of cruciform section. The control members 17 are disposed on a lattice between containers 5 and are movable from below into and out of the reactor core within cruciform-shaped passages 40, 41 penetrating the support plates 15 and 16 respectively. The upper end terminations 11 carry lugs 38 with holes 42 for engagement by projections on a grab (not shown) to allow lifting and lowering of the containers 5.

The latching members 6 are formed by flat strips 20 of stainless steel movable longitudinally between circular guides 21 carried on the lower face of the lower support plate 16. The strips 20 have parallel sided sections 23 for engagement with circumferential grooves 24 on the lower ends of the end-terminations 12 and cut-away portions 25, which, when registered with the grooves 24, provide clearance from the lower end of the end terminations 12.

The latching members 7 are formd by spindles 26 rotatable in tubular supports 27 aligned with the axes of the fuel assemblies 2 and attached to the lower end terminations 12 by webs 28. The lower ends of the spindles 26 are supported by webs 43 welded to the support plate 16 and the spindles carry cranks 29 pivotally connected to the strips 20 by links 30 and pivot pins 31, 32. The upper ends of the spindles 26 carry locking members 33 having four radially extending arms 34 disposed at right angles to each other. The arms 34 taper outwardly as shown (FIGURE 2) and the span of the arms is slightly less than the bores of the supports 27.

Referring now to FIGURE 4, the core structure 1 (with some of the fuel assemblies 2 and control rods 17 removed for clarity) is shown disposed in a nuclear reactor 51 which is cooled and moderated by "Santowax R," a terphenyl-based organic liquid (see Papers Nos. 421 and 1779 by C. A. Trilling, 1958 Geneva Conference on the Peaceful Uses of Atomic Energy, volumes 9 and 29 respectively, wherein organic cooled and moderated nuclear reactors and their moderator/coolants are described in detail). The core structure 1 has a reflector portion 1a and is supported within a cylindrical pressure vessel 52 having external support brackets 53 resting on an annular support structure 54. The core structure 1 is supported by a mild steel skirt 55 serving as a thermal shield, the skirt 55 having an external support ring 56 resting on an annular support 57 attached to the inner wall of the vessel 52. The fuel element support plate 16 is strengthened by transverse beams 58 and rests upon an annular suport 59 at the lower end of the skirt 55. The fuel element support plate 15 is carried on brackets 60 welded to the inner wall of a mild steel structure 61 of tubular form which rests upon the support 16. The support 15 carries a grid-like structure 62 which serves as a guide for the control rods 17. The structure 61 serves as a second thermal shield. A third thermal shield is provided by a thick-walled, mild steel structure 63 of tubular form which surrounds the skirt 55. The structure 63 is supported by brackets 64 welded to the lower interior of the pressure vessel 52. The lower end of the skirt 55 is located by keys 65 welded to the skirt 55 and keyways 56 welded to the brackets 64.

The pressure vessel 52 has coolant inlets 67 and coolant outlets 68, divided from each other by the skirt 55 and its supoprt ring 56. The organic liquid is pumped (at about 100 lbs. per suqare inch) through the inlets 67 to pass downwardly between the structure 63 and skirt 55 before passing in counter-flow up through the core structure 1 to receive heat from the fuel assemblies 2 therein and then over the upper end of the skirt 55 to leave the pressure vessel 52 by way of the outlets 68. After passage through external heat exchangers the organic liquid is re-circulated through the core structure 1. To avoid stagnation of liquid trapped between the structure 63 and the pressure vessel 52 and between the skirt 55 and structure 61, outlet ports 69, 70 are provided in the structures 63 and 61. The control rods 17 are manipulated from below the pressure vessel 52 by actuating apparatus housed in stand pipes 61. The reactor core can be re-fuelled en bloc by removal of a dome 72 from the upper end of the pressure vessel 52, after cutting away a weld joint 73. The head of organic liquid above the core structure 1 provides a shield when this refuelling operation is carried out. Selective refuelling is provided by refuelling apparatus insertable into an aperture 74 in the dome 72, the aperture normally being sealed off by a cover 75.

The latching members 6 and hence the latching members 7 are moved by rack and pinion type actuators 83 disposed externally of the pressure vessel 52. The pinions 77 of the actuators are rotated by electric motors 78 mounted on supports 79 and the racks 77 of the actuators are connected to the strips 20 through rods 80 (FIGURE 5). The rods 80 are joined to the strips 20 by welds 81. The strips 20 pass through slots 82 in the skirt 55 and the rods 80 through holes 83 in the structure 63 and holes 84 in the pressure vessel 52. The rods 80 are sealed to the pressure vessel 52 by gland boxes 85 attached to the pressure vessel 52 by bolts 86.

To fuel the reactor, the strips 20 are moved into the position shown in FIGURE 1 wherein the locking members 33 are in the position shown in FIGURE 3. The fuel as assemblies 2, that is to say the individual containers 5 complete with fuel elements 4, are next lowered one by one into the reactor core by engagement of projections on a refuelling grab with the holes 42 of the lugs 38 carried by the containers 5. As the fuel assemblies 2 are lowered they are located first by the apertures 13 in the support plate 15, then by penetration of the locking members 33 within the tubular supports 27 and finally by insertion of the lower end terminations 12 into the apertures 14 in the support plate 16. The gaps 22 between adjacent grid supports 12 allow clear passage of the arms 34 of the locking member 33 when the tubular supports 27 are moved over the spindles 26. The strips 20 are now moved in the direction of the arrow 39 until the parallel-sided sections 23 engage with the grooves 24 on the lower ends of the terminations 12. Simultaneously, movement of the strips 20 causes rotation of the spindles 26 which move the arms 34 of the locking members 33 from the position shown in FIGURE 3 to a position whereby they traverse adjacent corners of the grid supports 10 at the lower ends of the fuel element groups. Removal of both the fuel elements 4 from the containers 5 and the container 5 from the core structure 1 is now prevented.

If radial "shuffling" of the fuel element groups is required, or if it is required to remove irradiated fuel elements 4 from the reactor core for processing after the reactor is shut down and coolant flow stopped, the strips 20 are moved in the opposite direction to the arrow 39 until the arms 34 of the latching members 7 are restored to the position shown in FIGURE 3 when any one of the fuel element groups complete with their grids can be lifted out of the containers 5 by its lifting head 37. The containers 5 are retained in the core reactor by the weight of the remaining fuel element groups but are free to be withdrawn if necessary.

In a modification, the cranks 29 are connected to the links 30 with "lost motion" by providing enlarged holes 87 (FIGURE 1) in the links 30 so that limited movement of the strips 20 can be made before causing rotation of the spindles 26. This "lost motion" between the cranks 29 and links 30 allows fuel element groups to be released from their containers 5 before release of the container from the core support structure 1. This arrangement does not rely on the weight of remaining fuel elements to retain a container 5 in the reactor core when a fuel element grab is withdrawn.

I claim:

1. In a nuclear reactor: a grid structure defining a lattice of space openings, a plurality of upright-disposed nuclear fuel containers of tubular form end-located by the openings of the grid structure, a plurality of separate groups of fuel elements disposed within each of the containers, a first series of locking members associated with the fuel containers and each operatively interposed between the separate groups of fuel elements and adapted to releasably secure in common all of the separate groups in a container against movement withdrawing them from the container, at least one first actuating member operatively connected to each locking member of said first series and adapted to displace locking member of said first series from a position securing separate groups of fuel elements to a position whereby said separate groups are withdrawable from the container, a second series of locking members associated with the fuel containers and each operatively interposed between the located end of a fuel container and the grid structure and adapted to releasably secure said located end of the fuel container to the grid structure against movement withdrawing said fuel container from the grid structure and at least one second actuating member connected to each locking member of said second series and adapted to displace the locking members of said second series from a position securing the fuel container to the grid structure to a position whereby said fuel container is withdrawable from said grid structure.

2. The arrangement of claim 1, having means mechanically interconnecting a plurality of said first and second actuating members with a single operating member, said means being adapted to operate said plurality of said first and second actuating members simultaneously upon movement of said operating member.

3. The arrangement of claim 1, having means mechanically interconnecting a plurality of first and second actuating members with a single operating member, said means being adapted to operate said plurality of said first and second actuating members in sequence upon movement of said operating member.

References Cited in the file of this patent
UNITED STATES PATENTS

| | | |
|---|---|---|
| 2,936,273 | Untermyer | May 10, 1960 |
| 2,984,609 | Dicson et al. | May 16, 1961 |
| 2,999,059 | Treshow | Sept. 5, 1961 |
| 3,039,949 | Newton et al. | June 19, 1962 |